May 23, 1967 D. ALLENDEN ET AL 3,321,626
MEASURING APPARATUS
Filed July 5, 1962

United States Patent Office 3,321,626
Patented May 23, 1967

3,321,626
MEASURING APPARATUS
Dennis Allenden, Beenham, near Reading, Keith Boddy, Reading, David Vernon Freck, Basingstoke, and Stanley Ernest Hunt, Reading, England, assignors to Associated Electrical Industries Limited, London, England, a British company
Filed July 5, 1962, Ser. No. 207,627
Claims priority, application Great Britain, July 7, 1961, 24,693/61
6 Claims. (Cl. 250—83.3)

This invention relates to measuring apparatus for indicating the relation of one quantity to another.

The invention has an important application in measuring apparatus for measuring the relative proportion of an ingredient in a mixture, and especially of radioactive substances such as the degree of enrichment of uranium fuel.

The main object of the invention is to provide apparatus which is simple and which can give a rapid indication.

According to the present invention measuring apparatus for measuring the relative relationship of one quantity to another includes means for generating electronic pulses having a recurrence rate dependent upon the first quantity, means for generating a second set of pulses at a recurrence rate dependent upon the second quantity, a first pulse counter which counts the first set of pulses positively, i.e. commencing from zero, and a second pulse counter which counts the output from the second set of pulses negatively, i.e. commencing at the maximum count and reducing, and means for indicating or recording the readings after a predetermined count. Preferably the counters are stopped when the number of pulses counted by the first counter is equal to the reading of the second counter.

It will be appreciated that the reading of the second counter will be the difference between its maximum count and the number actually counted. Thus, by suitably choosing the maximum count of the second counter, e.g. in a tens multiple, the reading of the first counter may give a direct reading of the proportion of the first number relative to the sum of the two numbers.

The invention is especially applicable to measuring the proportion of an ingredient in a mixture. In such a case one of the sets of pulses would have a frequency dependent upon the proportion of the first ingredient and the second set a frequency proportional to the remaining ingredient or ingredients.

For example, in the case of two radioactive constituents such as $U^{235}$ and $U^{238}$, the first counter would be arranged to count positively and the second negatively and the counting would be stopped when the two counters give the same readings so that the sum of the pulses counted by the two counters will be equal to the maximum count of the second counter and by making this a multiple of ten it may be arranged that the reading of the first counter gives a direct indication of the proportion of that constituent, e.g. $U^{235}$, in the mixture.

In such a case the radiation may be detected by a solid state detector; the output, which will include both pulses representative of both $U^{235}$ and $U^{238}$, is amplified and applied through a gate to a pulse height analyser giving two pulse outputs of which one will be dependent upon the $U^{235}$ and applied to a first counting circuit and the other output which is dependent upon the $U^{238}$ is applied to the second counting circuit. When the two counts are equal the coincidence circuit closes the gate and the reading then of the first counter may be arranged to give a direct indication of the enrichment.

In cases in which the substances are not radioactive one quantity can control the frequency of a first pulse generator and the other that of a second pulse generator.

In order that the invention may be more clearly understood reference will now be made to the accompanying drawings in which.

Activity in the sample is monitored by a solid state detector, i.e. a semi-conductor p-n junction to which a reverse bias is applied and which conducts when irradiated. The resulting energy-proportional pulses are amplified to a level suitable for pulse height analysis. $\alpha$ Particles from $U^{235}$ have energies 4.40 and 4.58 mev., whilst those from $U^{238}$ have an energy of 4.18 mev. These can readily be distinguished from each other using a solid state detector. A simple two-channel pulse height analyser circuit selects and sorts pulses at $U^{238}$ and $U^{235}$ amplitudes.

Figure 2:
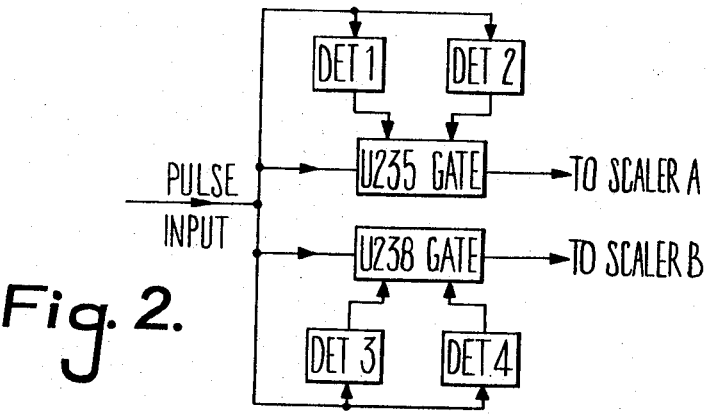
FIG. 2 shows in greater detail the arrangement of the pulse height analyser of FIG. 1.

Pulse height analysers are well known and may be arranged for example as shown in FIG. 2.

In the arrangement of FIG. 2 inputs are applied both to the $U^{235}$ gate and to the $U^{238}$ gate. The $U^{235}$ gate is controlled by two detectors DET1 and DET2. DET1 has an upper energy level cut off and DET2 a lower energy level cut off. These two levels would be so chosen that they are at the upper and lower levels of the $U^{235}$ energy band. Thus, energy at a level within the $U^{235}$ band will cause both detectors to pass signals to the $U^{235}$ gate to open it and pass pulse signals to scaler A. Similarly, detector 3 has an upper energy level cut off and detector 4 a lower energy level cut off for $U^{238}$ and these control the $U^{238}$ gate.

Whilst pulse height analysis is employed to separate the $U^{235}$ and $U^{238}$ pulses it will be appreciated that these will inherently have different recurrent frequencies.

Figure 1:
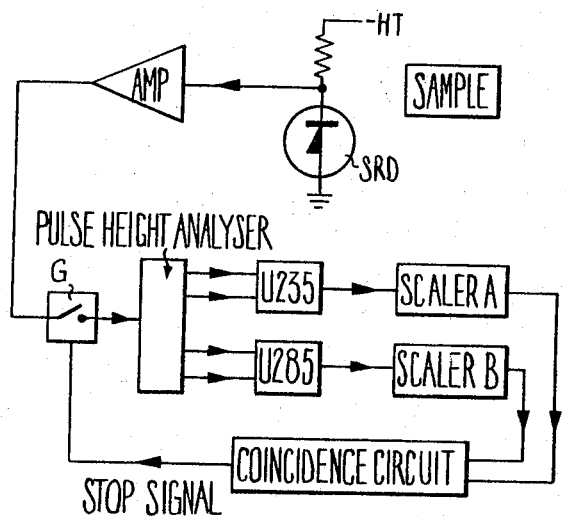
FIG. 1 shows in block form an example of apparatus for determining the enrichment of uranium.

Reverting to FIGURE 1 the pulses from the two outputs are fed independently to two scalers. One of these, for example scaler A, starts from zero and counts upwards towards full scale count; the other starts at full scale count and incoming pulses cause it to count downwards towards zero. If at any instant after starting the measurement $n_1$ pulses have been fed to scaler A and $n_z$ pulses to scaler B, the totals in the scalers are $n_1$ and $(T-n_z)$ respectively, where T is the total scaler capacity, and is conveniently chosen as some multiple of 10, say 1000, to make the instrument direct reading.

A coincidence circuit is caused to operate when the counts in the two scalers are equal, i.e. in the example quoted above when $n_1=1000-n_z$, and the output signal from this circuit opens a gate at the input to the analyser, thus terminating the measurement. At the instant of coincidence $n_1+n_z=1000$, and hence the reading $n_1$ is a direct measure of the proportion of $U^{235}$ in the specimen.

As described the instrument is intended for the determination of the proportion of $U^{235}$ in uranium, but may also be applied to the direct measurement of the relative proportions of two radioactive emitters in any material.

Figure 3:
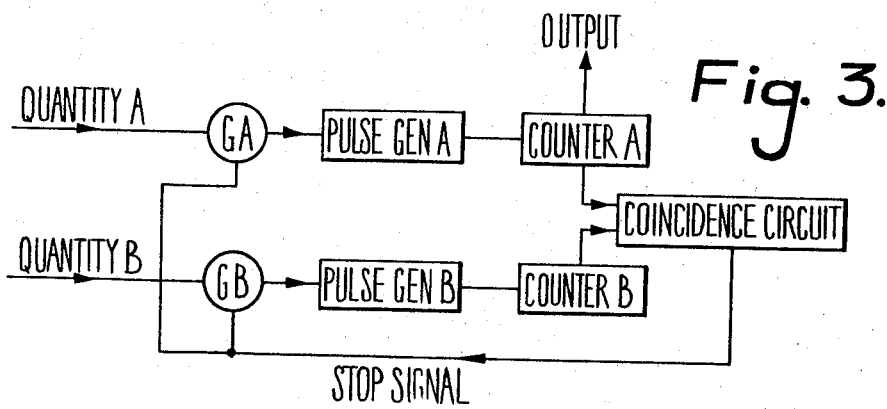
FIG. 3 shows the invention applied to uses in which radioactive materials are not employed.

Whilst in the specific embodiment of the invention as above described the pulses are derived from radioactive substances it will be understood that the invention is not so limited and FIG. 3 shows an arrangement in which one of the quantities referred to as A controls the frequency of a first pulse generator A whilst the second quantity B controls the frequency of a pulse generator B. These may be of any well known construction such as oscillators followed by squaring and differentiating circuits.

The pulse generator outputs are fed to respective counter circuits which in turn feed a coincidence circuit applying a stop signal to the gates.

The output from counter A may be an indication or record or both.

What we claim is:

1. Measuring apparatus for measuring the relationship of one quantity to another comprising means for generating a first set of electrical pulses at a recurrence rate dependent upon the first quantity, means for simultaneously generating a second set of electrical pulses at a recurrence rate dependent upon the second quantity, a first pulse counter which counts the first set of pulses positively, i.e. commencing from zero, a second pulse counter which counts the second set of pulses negatively, i.e., commencing at the maximum count and reducing the two counts starting simultaneously, and means for reading at least said first count when both counters reach the same numerical figure.

2. Measuring apparatus for measuring the relative proportion of an ingredient in a mixture comprising means for generating a first set of electrical pulses at a recurrence rate dependent upon the degree of concentration of a selected constituent in a mixture, a means for simultaneously generating a second set of electrical pulses at a recurrence rate dependent upon the degree of concentration of the remainder of the mixture, a first pulse counter which counts the first set of pulses positively, i.e. commencing from zero, a second pulse counter which counts the second set of pulses negatively, i.e. commencing at the maximum count and reducing, and the second count starting simultaneously with the first count, and means for stopping the two counters simultaneously when both counters reach the same number.

3. Measuring apparatus for measuring the relative proportion of a substance in a mixture of substances comprising detector means producing a first set of electrical pulses at a recurrence rate dependent upon the degree of concentration of a selected constituent in a mixture, means for generating second set of pulses at a recurrence rate dependent upon the degree of concentration of the remainder of the mixture, a first pulse counter which counts the first set of pulses positively, i.e. commencing from zero, a second pulse counter which commencing simultaneously with the first counter counts the second set of pulses negatively, i.e. commencing at the maximum count which is a multiple of 10 and reducing, a coincidence circuit fed with said counts and means for stopping said count when the readings of the two counters coincide.

4. Measuring apparatus for measuring the relative proportion of uranium-235 in a mixture of uranium-235 and uranium-238 comprising detector means for generating a first set of pulses at a recurrence rate dependent upon the degree of concentration of uranium-235 in the mixture and for generating a second set of pulses at a recurrence rate dependent upon the degree of concentration of the uranium-238, means for separating said two sets of pulses, a first pulse counter which counts the first set of pulses positively, i.e. commencing from zero, a second pulse counter which commencing simultaneously with the first counter counts the second set of pulses negatively, i.e. commencing at the maximum count and reducing, and means for reading at least the first count when the readings of the counters coincide.

5. Measuring apparatus for measuring the relative proportion of uranium-235 in a mixture of uranium-235 and uranium-238 comprising means for generating a first set of pulses at a recurrence rate dependent upon the degree of concentration of uranium-235 in the mixture, a means for generating a second set of pulses at a recurrence rate dependent upon the degree of concentration of the uranium-238, pulse height analyser means for separating said two sets of pulses, a first pulse counter which counts the first set of pulses positively, i.e. commencing from zero, a second pulse counter which commencing at the same instant on the first counter counts the second set of pulses negatively, i.e. commencing at the maximum count and reducing, and means for reading at least first count when the readings of the counters coincide.

6. Measuring apparatus for measuring the relationship of one quantity to another comprising a first pulse generator means for generating a first set of electrical pulses at a recurrence rate dependent upon the degree of concentration of a selected constituent in a mixture, a second pulse generator means for generating a second set of pulses at a recurrence rate dependent upon the degree of concentration of another quantity, a first pulse counter which counts the first set of pulses positively, i.e. commencing from zero, a second pulse counter which commencing at the same instant as the first counter counts the second set of pulses negatively, i.e. commencing at the maximum count which is a multiple of 10 and reducing, and means for stopping the two counters simultaneously when the counter readings coincide and means for determining at least the reading of the first counter.

References Cited by the Examiner

UNITED STATES PATENTS

| | | | |
|---|---|---|---|
| 2,436,104 | 2/1948 | Fisher et al. | 235—151 |
| 2,641,696 | 6/1953 | Woolard | 235—177 |
| 2,853,235 | 8/1958 | Brinster et al. | 235—92 |
| 2,985,368 | 5/1961 | Kohler et al. | 235—92 |
| 3,005,911 | 10/1961 | Burhans | 235—151 |

MAYNARD R. WILBUR, *Primary Examiner.*

MALCOLM A. MORRISON, *Examiner.*

J. F. MILLER, G. MAIER, *Assistant Examiners.*